E. L. BROWN.
AIR HOSE COUPLING.
APPLICATION FILED MAR. 15, 1909.

939,211.

Patented Nov. 9, 1909.

Witnesses:
F. C. Valentine
M. S. Rinehart.

Inventor:
Edward L. Brown
by Obed C. Billman
his attorney.

UNITED STATES PATENT OFFICE.

EDWARD L. BROWN, OF CLEVELAND, OHIO, ASSIGNOR OF ONE-THIRD TO P. L. ANDREWS, OF TOLEDO, OHIO, AND ONE-THIRD TO CHAS. EISELE, OF CLEVELAND, OHIO.

AIR-HOSE COUPLING.

939,211.  Specification of Letters Patent.  Patented Nov. 9, 1909.

Application filed March 15, 1909. Serial No. 483,412.

*To all whom it may concern:*

Be it known that I, EDWARD L. BROWN, a citizen of the United States, residing at Cleveland, in the county of Cuyahoga and State of Ohio, have invented certain new and useful Improvements in Air-Hose Couplings, of which the following is a specification.

My invention relates to improvements in air-hose couplings for use in connection with air-hose, the present embodiment of the invention being particularly designed for use in connection with air-hose used in connection with pneumatically operated tools and machinery and is adapted to automatically shut off any further flow of air when broken at a coupling or detached. It also enables one or more lengths of hose to be detached successively without closing the air valve in the line-pipe.

The primary object of the invention is to provide a generally improved coupling of this class which will be exceedingly simple in construction, cheap of manufacture, efficient in use, and much better adapted to its intended purposes than any other device of the same class with which I am acquainted.

With the above mentioned ends in view, the invention consists in the novel construction, arrangement, and combination of parts hereinafter described, illustrated in one of its embodiments in the accompanying drawings, and particularly pointed out in the appended claims.

Figure 1:
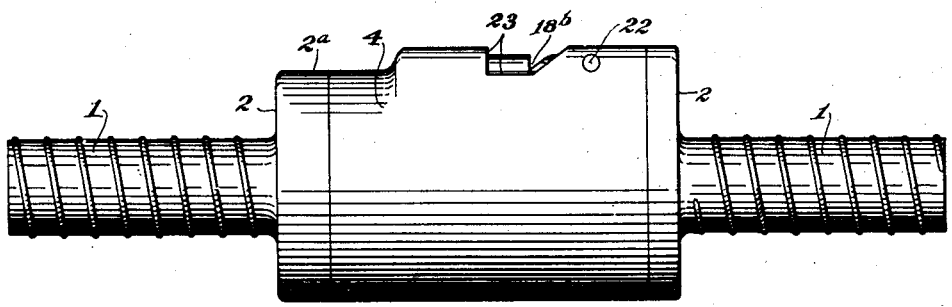
Figure 2:
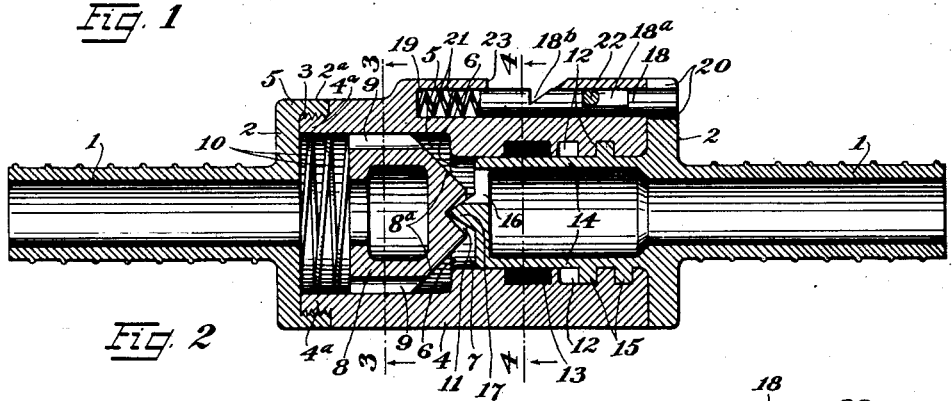
Figure 3:
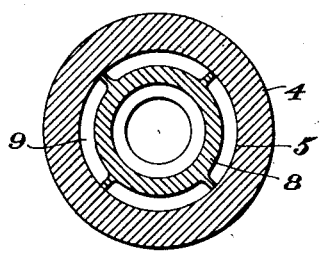
Figure 4:
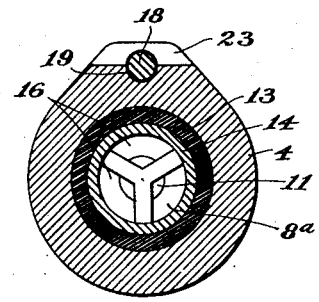
Figure 5:
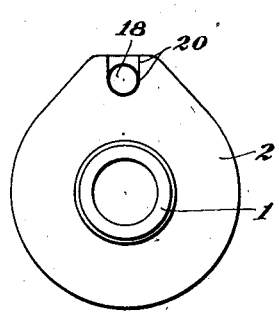

Referring to the drawings, forming a part of this specification, Figure 1, is a side elevation of a detached coupling in its assembled or connected position. Fig. 2, a longitudinal sectional view of the same. Fig. 3, a cross sectional view taken through line 3—3, of Fig. 2. Fig. 4, a cross sectional view taken through line 4—4, of Fig. 2. Fig. 5, an end view of the improved coupling.

Similar numerals of reference designate like parts throughout all the figures of the drawings.

The improved coupling comprises two coupler members each provided with an externally screw threaded shank portion 1, adapted to be screwed within the bore of the hose, and to be securely fastened or clamped therein in any suitable and convenient manner, each of said shank portions terminating in flanged heads 2, one of said flanged heads being provided with an internally threaded opening 3, forming in the present instance, a threaded flanged head $2^a$.

A valve coupling section or block 4, is removably connected to one of the coupler members and, in the present instance, is secured thereto by being provided at one end with an externally screw threaded portion $4^a$, screwed into the internally threaded opening 3, of the flanged head $2^a$. The valve coupling section or body 4, is provided with a valve chamber or opening 5, provided with an annular flange-seat 6, and terminating in a coupler receiving opening 7. A spring-resisted valve head 8, is slidably mounted in the valve chamber or opening 5, and is provided, in the present instance, with a plurality of peripheral air inlet openings or ports 9, communicating at all times with the valve chamber 5. The valve head is adapted to be moved to and held in its seated position upon the annular valve seat 6, by the action of the spring 10, in the rear portion of the valve chamber, and said valve head is provided, in the present instance, with a conically shaped head $8^a$, terminating in a cone shaped centrally located pocket-recess 11.

The coupler receiving opening 7, is internally threaded, in the present instance, by means of spirally arranged threads or grooves 12, and is preferably provided with a packing-ring or gasket 13. The receiving opening 7, is adapted to receive and contain a valve-head-engaging hollow valve-stem 14, of the male coupling member, said valve-stem being secured, in the present instance, by means of a spirally arranged flange or rib 15, adapted to traverse the corresponding groove 12, in the receiving opening 7. The valve-stem 14, is provided, in the present instance, with a plurality of air inlet openings or ports 16, and is provided at its forward end with a cone shaped projection 17, adapted to take into and be seated within the pocket-recess 11, of the valve head 8, whereby the latter will be unseated when the valve-stem carrying member or coupler has been drawn up and whereby communication is established between the air inlet ports 9, of the valve head and the inlet openings or ports 16, of the valve stem 14, as shown most clearly in Fig. 2, of the drawings.

As a means for locking the valve-stem carrying coupler member and preventing the unscrewing of the latter when drawn up, a latching bolt 18, is slidably mounted in a guide opening 19, of the valve coupling section or body 4, and is normally projected into a bolt receiving recess 20, (see Figs. 2 and 5) of the adjacent flanged head 2, by means of a spring 21. The latching bolt is longitudinally secured in the guide opening 19, by means of a transverse pin 22, passing through a segmental recess 18ª, of the latching bolt, said latching bolt being manipulated by means of a thumb-notch 18ᵇ, exposed in the opening 23, of the valve coupling section 4.

From the foregoing description, taken in connection with the accompanying drawings, the operation and advantages of my invention will be readily understood.

Having thus described my invention, without attempting to set forth all the forms in which it may be made, or all the modes of its use, what I claim and desire to secure by Letters Patent is,—

1. In a coupling for tubular conduits, the combination with a tubular member having a longitudinal opening therethrough, said opening being enlarged in diameter toward one of its ends so as to form an annular shoulder, that portion of the opening having the smaller diameter being provided with a circumferential groove, of a valve in the enlarged part of said opening, said valve being adapted to seat itself on said shoulder, a second tubular member, means for attaching the second tubular member to the first tubular member, a tubular extension on the said second member, said extension being adapted to enter the smaller part of the said opening and to hold the said valve away from the shoulder, when the members are attached together, a packing ring within the said circumferential groove, said ring being adapted to contact with the said tubular extension and to establish therewith a fluid proof joint, and means for locking the two tubular members together after they have been attached.

2. In a coupling for tubular conduits, the combination with a tubular member having a longitudinal opening therethrough, said opening being enlarged in diameter toward one of its ends so as to form an annular shoulder, that portion of the opening having the smaller diameter being provided with a circumferential groove adjacent said shoulder and with a spiral groove adjacent the outer end of said opening, of a valve in the enlarged part of said opening, said valve being adapted to seat itself on said shoulder, a second tubular member having a spiral rib adapted to fit as a screw thread into the said spiral groove, a tubular extension on the said second member, said extension having a diameter substantially equal to the smaller diameter of the said opening, said extension being adapted to push the valve away from the said shoulder when the second member is screwed into the first member and a packing ring within the said circumferential groove, said ring being adapted to contact with the said tubular extension and to establish therewith a fluid-proof joint.

3. In a coupling for tubular conduits, the combination with a tubular member having a longitudinal opening therethrough, said opening being enlarged in diameter toward one of its ends so as to form an annular shoulder, that portion of the opening having the smaller diameter being provided with a circumferential groove adjacent said shoulder and with a spiral groove adjacent the outer end of said opening, of a valve in the enlarged part of said opening, said valve being adapted to seat itself on said shoulder, a second tubular member having a spiral rib adapted to fit as a screw thread into the said spiral groove, a tubular extension on the said second member, said extension being adapted to push the valve away from the said shoulder when the second member is screwed into the first member, a packing ring within the said circumferential groove, said ring being adapted to contact with the said tubular extension and to establish therewith a fluid-proof joint, and means for locking the said second member in position after the valve has been moved off of the said shoulder.

4. In a coupling for tubular conduits, the combination with a coupling section provided at one end with a valve-chamber and at the other with a receiving opening, said receiving opening having a spiral groove and carrying a gasket intermediate said spiral groove and said valve-chamber, and a spring-resisted valve normally closing communication between said chamber and receiving opening; of an opposing coupling section having a flanged head terminating in an open valve-stem adapted to unseat said valve when the coupling sections are drawn together, said valve-stem being provided with a peripheral spiral rib adapted to traverse said spiral groove and having its open end adapted to take into said gasket and form a fluid-tight joint upon the initial engagement of said spiral rib with said spiral groove and prior to the unseating of said valve by said valve-stem.

In testimony whereof I have affixed my signature, in presence of two witnesses.

EDWARD L. BROWN.

Witnesses:
O. C. BILLMAN,
F. E. LYON.